United States Patent [19]
Keyser et al.

[11] Patent Number: 5,928,369
[45] Date of Patent: *Jul. 27, 1999

[54] AUTOMATIC SUPPORT SYSTEM AND METHOD BASED ON USER SUBMITTED STACK TRACE

[75] Inventors: David Michael Keyser, San Jose; Dennis Murray Baylor, Los Altos, both of Calif.

[73] Assignee: Synopsys, Inc., Mountain View, Calif.

[*] Notice: This patent issued on a continued prosecution application filed under 37 CFR 1.53(d), and is subject to the twenty year patent term provisions of 35 U.S.C. 154(a)(2).

[21] Appl. No.: 08/672,550

[22] Filed: Jun. 28, 1996

[51] Int. Cl.$^6$ .................................................. G06F 11/30
[52] U.S. Cl. ........................................ 714/47; 395/183.14
[58] Field of Search ............................ 395/185.1, 183.13, 395/183.14, 183.15, 336

[56] References Cited

U.S. PATENT DOCUMENTS

| | | | |
|---|---|---|---|
| 4,108,360 | 8/1978 | Beismann et al. | 395/183.13 |
| 4,853,851 | 8/1989 | Horsch | 395/183.14 |
| 5,237,677 | 8/1993 | Hirosawa et al. | 395/185.1 |
| 5,287,505 | 2/1994 | Calvert et al. | 395/183.13 |
| 5,293,456 | 3/1994 | Guez et al. | 395/24 |
| 5,467,449 | 11/1995 | Gauronski et al. | 395/185.1 |
| 5,548,715 | 8/1996 | Maloney et al. | 395/183.15 |
| 5,619,656 | 4/1997 | Graf | 395/185.1 |

OTHER PUBLICATIONS

Microsoft Press, "Computer Dictionary 2nd edition", pp. 112, 143 and 392, 1994.

*Primary Examiner*—Robert W. Beausoliel, Jr.
*Assistant Examiner*—Scott T. Baderman
*Attorney, Agent, or Firm*—Wagner, Murabito & Hao

[57] ABSTRACT

A system and method for automatically analyzing a program system error. In one embodiment, the present invention electronically receives a stack trace of a program which has suffered an unknown system error. The present invention then compares the electronically received stack trace with a reference stack trace having a known system error associated therewith. In so doing, the present invention determines the similarity between the electronically received stack trace and the reference stack trace. When a predetermined degree of similarity exists between the electronically received stack trace and the reference stack trace, the present invention automatically reports information about the known system error associated with the reference stack to the address from which the electronically received stack trace was sent. Because the degree of similarity exists between the electronically received stack trace and the reference stack trace associated with the known system error, the remedial actions for the known system error also apply to the unknown system error. In so doing, the present invention provides a method and system which quickly and automatically reports the source and possible solution of a program system error, to a user of the program, without requiring extensive customer support intervention.

19 Claims, 3 Drawing Sheets

FIG. 2B

AUTOMATIC SUPPORT SYSTEM AND METHOD BASED ON USER SUBMITTED STACK TRACE

TECHNICAL FIELD

This invention relates to program system error correction. Specifically, the present invention relates to automatically determining the nature of a program system error.

BACKGROUND ART

Computer errors can be extremely frustrating to the computer user. Having a computer "crash" or "freeze" in the middle of a project can erase hours of hard work. Although a computer can typically be restarted after such a crash, some program errors are not so easily remedied. As an example, a fatal internal system error can render a computer program inoperative. That is, the program user may run into the same crash or error each time the program is used. Thus, the user is not able to merely reboot and start over again. Instead, the user must determine the cause of the error and attempt to solve the problem before using the program again.

In one attempt to alleviate difficulties associated with internal system errors, some systems provide stack traces upon the occurrence of a fatal internal system error. A stack trace provides a list of procedure calls used by the program until just prior to the internal system error. Thus, once the program crash occurs, the user is theoretically able to evaluate, in chronological order, the program routines performed prior to the internal system error. Although stack traces are intended to provide insight to the cause or causes of the internal system error, often program users have no idea what to do with the stack trace information. That is, the stack trace does not assist most users in determining the cause of the internal system error. Therefore, the user must seek assistance from a program expert such as, for example, a customer support technician in order to determine a solution to the internal system error. Such an approach requires the program user to seek out and contact the program expert, explain the internal system error, describe the stack trace contents, and then attempt to implement any suggested solutions. As a result, the program user is subjected to significant inconvenience and experiences substantial program downtime.

As yet another drawback, many prior art stack traces are presented in encoded form. That is, if the programmers of the crashed program do not want the specific procedural call names and orders to be publicly available, the stack trace will be in encoded form. Therefore, even if the user has the knowledge and ability to interpret a stack trace, the program user is restricted from knowing the content of the stack trace. As in the above example, the user must seek assistance from a program expert such as, for example, a customer support technician. More specifically, the user must seek assistance from a program expert having the authority and ability to decode the stack trace. Such an approach requires the program user to seek out and contact the program expert, explain the internal system error, describe the encoded stack trace contents, and then attempt to implement any suggested solutions. Again, the program user is subjected to significant inconvenience and experiences substantial program downtime.

Thus, a need exists for a method and system which automatically determines the nature of a program system error. A further need exists for a method and system which quickly reports the source of the system error to the user of the program which has suffered the system error. Yet another need exists for a method and system which meets the above needs without requiring extensive customer support intervention.

DISCLOSURE OF THE INVENTION

The present invention provides a method and system which quickly and automatically reports the source of a program system error to the user of the program without requiring extensive customer support intervention. The present invention accomplishes the above achievements with a computer-implemented system and method for automatically analyzing a program system error.

Specifically, in one embodiment, the present invention provides a system and method for automatically analyzing a program system error. In one embodiment, the present invention electronically receives a stack trace of a program which has suffered an unknown system error. The present invention then compares the electronically received stack trace with a reference stack trace having a known system error associated therewith. In so doing, the present invention determines the similarity between the electronically received stack trace and the reference stack trace. When a predetermined degree of similarity exists between the electronically received stack trace the reference stack trace, the present invention automatically reports information about the known system error associated with the reference stack to the address from which the electronically received stack trace was sent. In the present embodiment, the information is, for example, a list of remedial actions which will prevent and/or correct the known system error. Because the degree of similarity exists between the electronically received stack trace and the reference stack trace associated with the known system error, the remedial actions for the known system error also apply to the unknown system error. If a predetermined degree of similarity does not exist between the electronically received stack trace and the reference stack trace, the present invention automatically directs customer support to contact the user who electronically forwarded to the received stack trace.

In another embodiment, the present invention electronically receives a stack trace of encoded procedural call names for the program which has suffered an unknown system error. The present embodiment then decodes the electronically received stack trace of encoded procedural call names such that a stack trace of decoded procedural call names is generated. The present invention then compares the electronically received stack trace with a reference stack trace having a known system error associated therewith, and performs the steps recited in the above embodiment.

In yet another embodiment, the present invention compares the electronically received stack trace with a plurality of reference stack traces wherein each of the plurality of reference stack traces has a respective known system error associated therewith. In the present embodiment, the present invention determines the similarity between the electronically received stack trace and each of the reference stack traces. The present invention then ranks the plurality of reference stack traces according to their degree of similarity to the electronically received stack trace. If any one of the stack traces has a predetermined degree of similarity with the electronically received stack trace, the present invention automatically reports information regarding that reference stack trace's respective known system error to the address from which the electronically received stack trace was sent. Additionally, in the present embodiment, the present invention ranks the information which is reported to the address from which the electronically received stack trace was sent. That is, information regarding a known system error associated with the stack trace having the greatest degree of similarity to the electronically received stack trace is given the highest rank. As a result, the present invention provides the receiver with information listed in order from that information corresponding to a stack trace having the greatest degree of similarity with the electronically received stack trace to that information corresponding to the stack trace having the least degree of similarity to the electronically received stack trace. However, the present invention is also well suited to informing the receiver of the rank of the information presented. Therefore, a receiver of the information can select to consider that information before considering information regarding a known system error associated with a reference stack trace having a lesser degree of similarity to the electronically received stack trace. If a predetermined degree of similarity does not exist between the electronically received stack trace and the reference stack trace, the present invention automatically directs customer support to contact the user who electronically forwarded to the received stack trace.

These and other objects and advantages of the present invention will no doubt become obvious to those of ordinary skill in the art after having read the following detailed description of the preferred embodiments which are illustrated in the various drawing figures.

BRIEF DESCRIPTION OF THE DRAWINGS

The accompanying drawings, which are incorporated in and form a part of this specification, illustrate embodiments of the invention and, together with the description, serve to explain the principles of the invention.

BEST MODE FOR CARRYING OUT THE INVENTION

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well known methods, procedures, components, and circuits have not been described in detail as not to unnecessarily obscure aspects of the present invention.

Some portions of the detailed descriptions which follow are presented in terms of procedures, logic blocks, processing, and other symbolic representations of operations on data bits within a computer memory. These descriptions and representations are the means used by those skilled in the data processing arts to most effectively convey the substance of their work to others skilled in the art. In the present application, a procedure, logic block, process, etc., is conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "receiving," "determining," "ranking," "comparing," "forwarding," or the like, refer to the actions and processes of a computer system, or similar electronic computing device. The computer system or similar electronic computing device manipulates and transforms data represented as physical (electronic) quantities within the computer system's registers and memories into other data similarly represented as physical quantities within the computer system memories or registers or other such information storage, transmission, or display devices. The present invention is also well suited to the use of other computer systems such as, for example, optical and mechanical computers.

COMPUTER SYSTEM ENVIRONMENT OF THE PRESENT INVENTION

Figure 1:
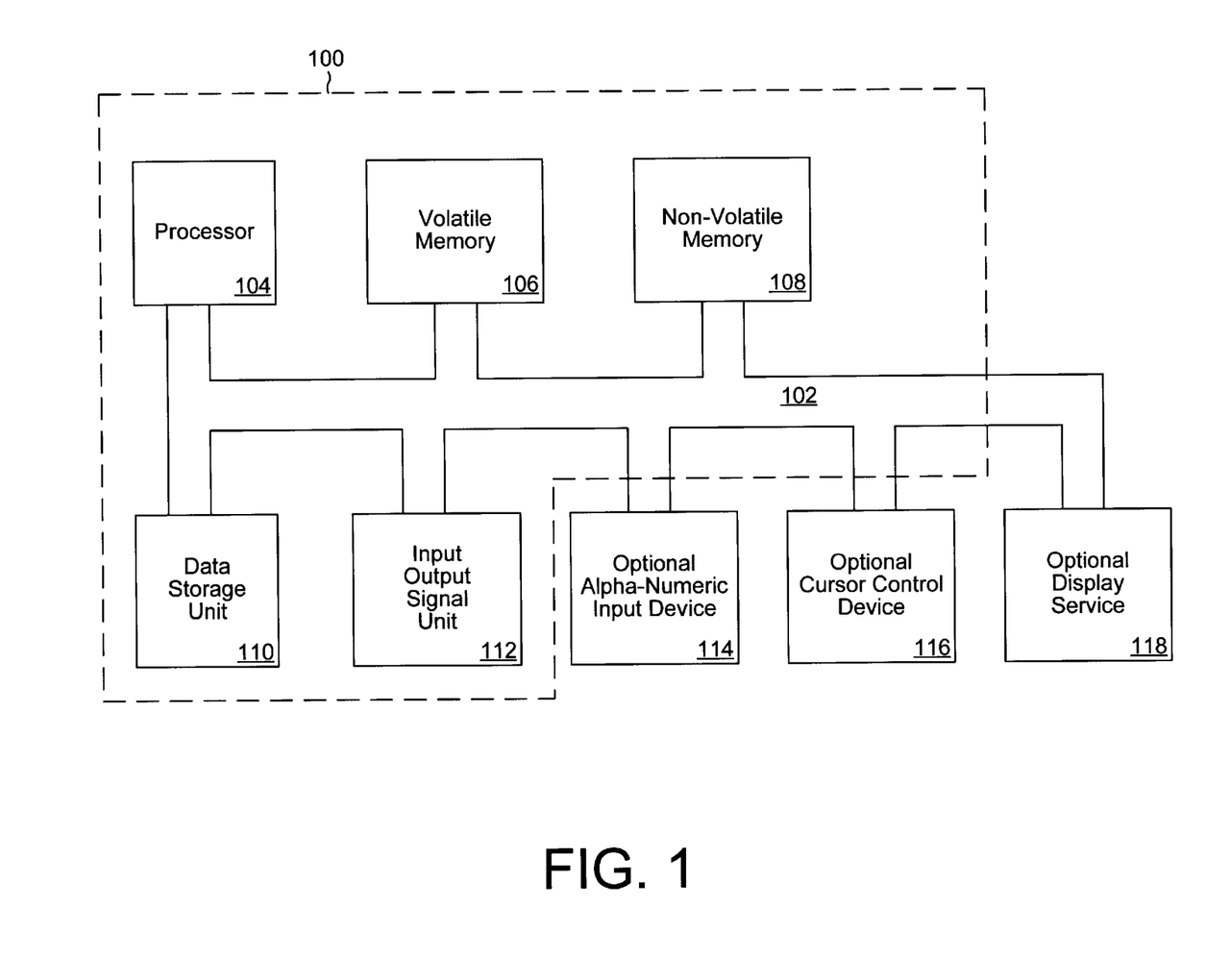
FIG. 1 is a schematic diagram of an exemplary computer system used as a part of an automatic system error analysis system in accordance with the present invention.

With reference now to FIG. 1, portions of the present automatic system error analysis (ASEA) system are comprised of computer-readable and computer-executable instructions which reside, for example, in computer-usable media of a computer system. FIG. 1 illustrates an exemplary computer system 100 used as a part of an ASEA system in accordance with the present invention. It is appreciated that system 100 of FIG. 1 is exemplary only and that the present invention can operate within a number of different computer systems including general purpose computers systems, embedded computer systems, and stand alone computer systems specially adapted for automatic system error analysis.

System 100 of FIG. 1 includes an address/data bus 102 for communicating information, and a central processor unit 104 coupled to bus 102 for processing information and instructions. System 100 also incudes data storage features such as a computer usable volatile memory 106, e.g. random access memory (RAM), coupled to bus 102 for storing information and instructions for central processor unit 104, computer usable non-volatile memory 108, e.g. read only memory (ROM), coupled to bus 102 for storing static information and instructions for the central processor unit 104, and a data storage device 110 (e.g., a magnetic or optical disk and disk drive) coupled to bus 102 for storing information and instructions. A signal input output comm device 112 (e.g. a modem) coupled to bus 102 is also included in system 100 of FIG. 1. System 100 of the present ASEA embodiment also includes an optional alphanumeric input device 114 including alphanumeric and function keys is coupled to bus 102 for communicating information and command selections to central processor unit 104. System 100 also optionally includes a cursor control device 116 coupled to bus 102 for communicating user input information and command selections to central processor unit 104. System 100 of the present embodiment also includes an optional display device 118 coupled to bus 102 for displaying information.

Display device 118 of FIG. 1, utilized with the present ASEA system, may be a liquid crystal device, cathode ray tube, or other display device suitable for creating graphic images and alphanumeric characters recognizable to a user. Optional cursor control device 116 allows the computer user to dynamically signal the two dimensional movement of a visible symbol (cursor) on a display screen of display device 118. Many implementations of cursor control device 116 are known in the art including a trackball, mouse, touch pad, joystick or special keys on alphanumeric input device 114 capable of signaling movement of a given direction or manner of displacement. Alternatively, it will be appreciated that a cursor can be directed and/or activated via input from alphanumeric input device 114 using special keys and key sequence commands. The present invention is also well suited to directing a cursor by other means such as, for example, voice commands. A more detailed discussion of the present ASEA system and the steps performed by the ASEA system is found below.

GENERAL DESCRIPTION OF THE AUTOMATIC SYSTEM ERROR ANALYSIS SYSTEM OF THE PRESENT INVENTION

Figure 2A:
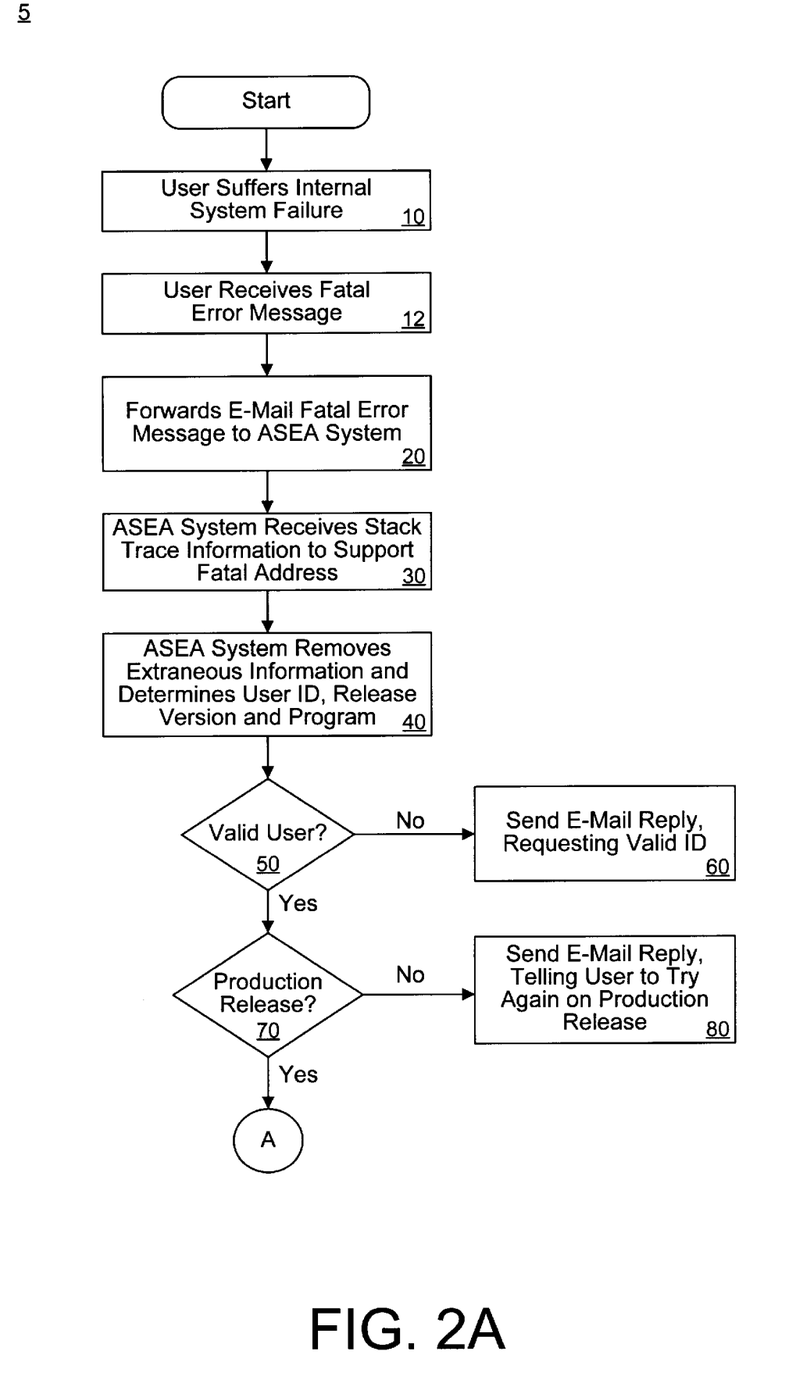
FIGS. 2A and 2B are a flow chart illustrating steps performed by the automatic system error analysis system in accordance with the present claimed invention.
Figure 2B:
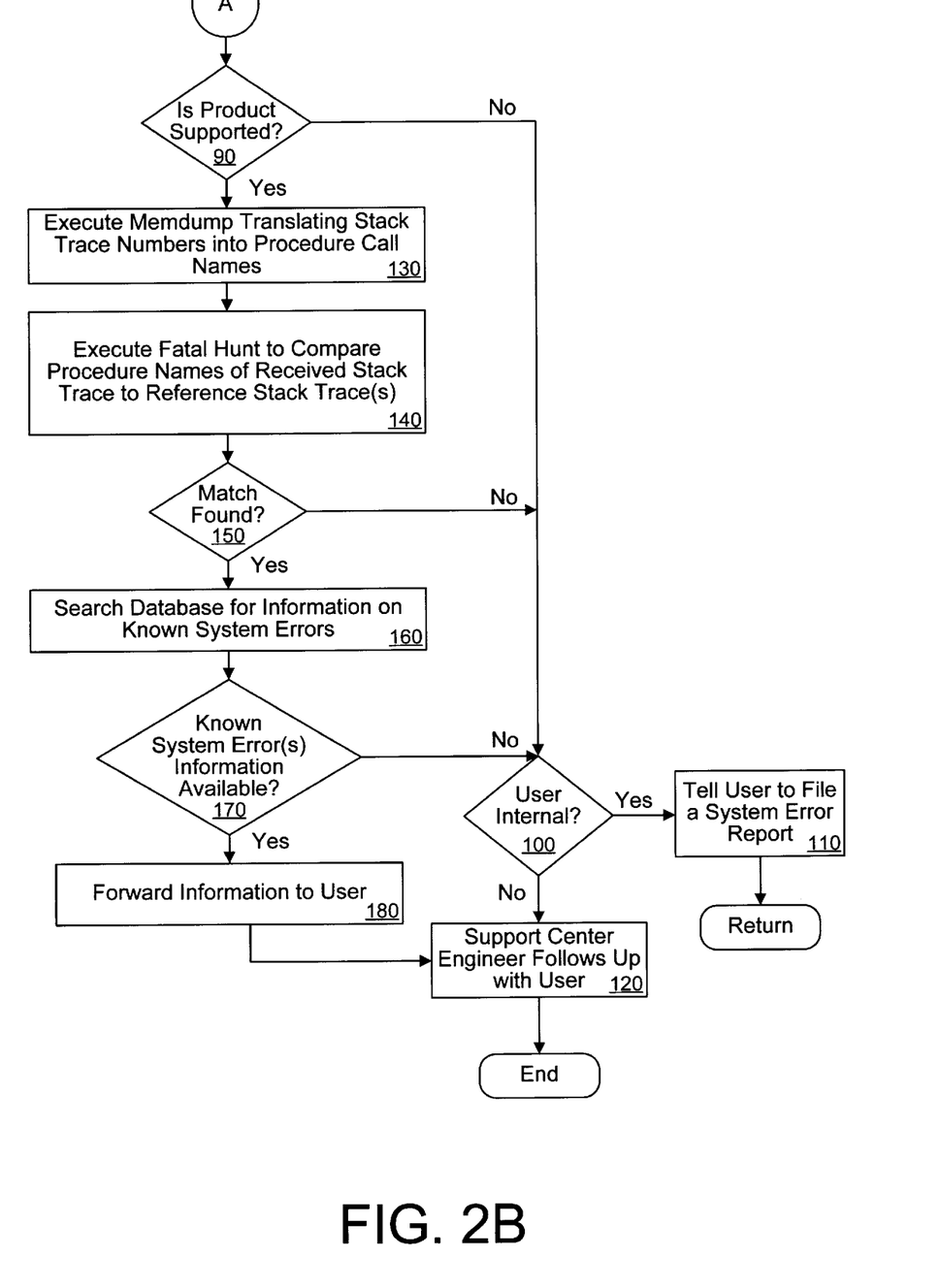

With reference next to FIGS. 2A and 2B, a flow chart 5 of steps used by the present ASEA system is shown. Flow chart 5 includes processes of the present ASEA system which are comprised of computer-readable and computer-executable instructions. The computer-readable and computer-executable instructions reside, for example, in data storage features such as computer usable volatile memory 106 and/or computer usable non-volatile memory 108. The computer-readable and computer-executable instructions are used to control, for example, the operation and functioning of central processor unit 104. In step 10, a program user suffers a fatal internal system error or crash.

As shown in step 12, the present invention then provides the user with a fatal error message. In one embodiment of the present invention, an interrupt handler is added to the stack trace generating program. In the prior art, a sample fatal error message and stack trace would appear as follows:

```
Fatal: Internal system error, cannot recover.
'7530604   7530752   7805540   7286228   7286328
7286916   7282296   2969060   2968528   2510796
2265748   2264024   2260408   776688    777544    144820
143140    140904    139000    7225772   7216728   20060
19672     19424     8900      8292'
```

However, the interrupt handler of the present invention causes the stack trace program to print a stack trace having additional material included therewith. An exemplary output of the stack trace message as created by the present invention is given below:

```
Fatal: Internal system error, cannot recover.
Please complete the following steps:
   1. Copy and paste completely everything
      between the lines in order to send the
      message in an e-mail.
   2. On the line id: replace <your_id_number> with
      your program user id number.
   3. E-mail the message to "ASEA address."
                              cut below this line start
id: <your_id_number>
getfatal
Release = "v3.1a"
Architecture = "Sparc"
Program = "program name"
'7530604   7530752   7805540   7286228   7286328
7286916   7282296   2969060   2968528   2510796
2265748   2264024   2260408   776688    777544    144820
143140    140904    139000    7225772   7216728   20060
19672     19424     8900      8292'
                    cut above this line
```

In the above embodiment, the present invention informs the user that a fatal system error has occurred. The present invention then directs the user to cut and paste the stack trace and the additional messages above and below the line as indicated. The present invention directs the user to e-mail the cut and pasted information to the address of the ASEA system. In the present embodiment, the additional information includes the program user's identification (id) number. The present invention also includes a "getfatal" address which instructs the present ASEA system to direct the stack trace information to the appropriate address within the ASEA system. (This step is discussed in detail below.) The present invention also records the release version, the architecture type, and the program name. It will be understood that the present invention is well suited to varying the information displayed along with the stack trace. Such variations can be made, for example, to suit the particular needs of users, program types, stack trace formats, and the like.

With reference still to FIG. 2A, in step 20, the user of the crashed program electronically forwards the cut and pasted stack trace information to the ASEA system. In the present embodiment, the stack trace information is forwarded to the present ASEA system via e-mail. Although the stack trace information is forwarded in such a manner in the present embodiment, the present ASEA system is also well suited to having the information forwarded using various other mailing methods.

In step 30, the present ASEA system receives the stack trace information. The ASEA system uses the "getfatal" address to direct the stack trace information the appropriate address within the ASEA system. In the present embodiment, the stack trace information is forwarded to a "support fatal" address of the present ASEA system. Although the present invention transfers the stack trace information to a separate address in the present embodiment, the present invention is also well suited to initially receiving the stack trace information at the desired address within the ASEA system. In such an embodiment, the present invention does not require forwarding the received stack trace information to separate address.

With reference next to step 40, once the stack trace information is received at the support fatal address, the present ASEA system removes all information except for the stack trace. That is, the ASEA system removes the user instructions, user id number, release version, architecture type, and the program name information. The information removed from the stack trace is saved for later use by the present ASEA system.

As shown in step 50, the present ASEA system determines whether the received user id number is a valid id number. That is, the present ASEA system compares the received user id number with a list of recognized user id numbers to insure that the stack trace information was sent from a valid program user.

If the user's id number does not appear to be a valid user id number, the ASEA system, in step 60, sends an e-mail to the user requesting that the user submit a valid id number. The ASEA system obtains the user's e-mail address from the return address attached to the stack trace information sent from the user. If the user is unable to provide a valid user id number, the present ASEA invention does not provide services to the program user.

In step 70, once the user's id number has been verified the present ASEA system uses the received release version and program name information to determine whether that version of the program is in production release.

Referring next to step 80, in the present embodiment, if the version of the program is not yet in production release, the ASEA system e-mails the user requesting the user to wait until the program is in production release before using the ASEA system. Although such an approach is used in the present embodiment, the ASEA system is well suited to providing services to program users even when the program version is not yet in production release.

With reference next to FIG. 2B, in step 90, the ASEA system uses the received release version and program name information to determine whether that version of the program is intended to be supported by the present invention. That is, is the present ASEA system determines whether support was intended to be provided for this particular program.

As shown in step 100, in the present embodiment, if the product is not supported, the ASEA system then determines whether the user is an outside user or is an internal user. An internal user is a user, for example, who works for the company providing the present ASEA system to outside users. An outside user is a user who, for example, subscribes to the present ASEA system.

In step 110, if the user is an internal user, the present ASEA system requests the user to file a system error report request. The system error report request directs ASEA personnel to determine the nature of the system error experienced by the internal user.

Referring now to step 120, if the user is an outside user, the present ASEA system directs a support center engineer to contact the user to discuss the nature of the user's system error.

With reference still to FIG. 2B, at step 130, ASEA executes a "memdump" translating the stack trace into procedure call names. That is, the present invention provides a stack trace or list of numbers. The numbers represent program routine names within the compiled executable program. In the present embodiment, the routines names are encoded into numbers so that the user does not have access to proprietary program information. However, the present invention is also well suited to being used with a stack trace which is not encoded.

Referring still to step 130, the stack trace is obtained by printing the contents of the computer stack at the time that the program crashes. An example of a program which prints a computer stack is "dbx", a debugger which is commonly available on Unix workstations. It is convenient to translate these numbers into meaningful names of the program routines which are identified by these numbers. This translation is performed by looking up the symbolic names of the routine identified by each number in a symbol table which was created at the time the program was compiled. An example of a program which performs this look up is dbx. Furthermore, *Compilers Principles, Techniques and Tools* by Alfred V. Aho, Ravi Sethi and Jeffrey D. Ullman describes techniques commonly used for building executable programs, including building symbol and string tables. Such techniques will be known to one skilled in the art.

In one embodiment, a program "memdump" is used to translate the stack trace numbers into meaningful names of the program routines identified by these numbers. An exemplary memdump program output follows:

_ih_default_handler
_ih_real_handler
_sigtramp
_proc_read_from_socket
_proc_read bytes
_proc_read_string
_my_routine0
_my_routine1
_my_routine2
_my_routine3
_my_routine4
_my_routine5
_my_routine6
_my_routine7 file1.o
_my_routine8
_my_routine9
_my_routine10
_my_routine11
_my_routine12
_my_routine13 file2.o
_my_routine14
_my_routine15
_my_routine16
_main The memdump program functions by processing a version of the executable which crashed and which still includes the symbol and string information used to create the executable program. The process of removing symbol and string tables from an executable is commonly known as "stripping" the executable. The stack trace numbers may be taken from a run of a stripped executable, but one must supply an unstripped executable to memdump.

In one embodiment, the memdump program functions as follows. The input to memdump is an unstripped executable and a numeric stack trace. Memdump then reads the symbol table of the unstripped executable, sorts the symbol table by address, and maps the symbolic names in the symbol table to strings which represent routine names. Memdump then loops through each address in the numeric stack trace, finds the corresponding routine name in the symbol table in memory, and prints the routine name.

Referring next to step 140, the present ASEA system compares the received stack trace with at least one known stack trace. In the present embodiment, this step is referred to as the "fatal hunt." In the fatal hunt step, the ASEA system receives the electronically received stack trace and returns information on system errors potentially related to the system error of the electronically received stack trace.

In the present embodiment, a database of known system errors must be built. Each time a fatal system error is encountered, an engineer creates a file which contains the stack trace at the time the program crashed. This file is named with a system error number for the fatal system error in question, and stored in a directory of such files. Although not performed in the present embodiment, the present invention is well suited to adding each newly encountered system error to the database. Thus, a database of reference stack traces having respective known system errors associated therewith is built.

The fatal hunt portion of the ASEA system of the present embodiment compares the electronically received stack trace with the reference stack traces stored in the database. The fatal hunt portion of the ASEA system determines whether a correlation exists between the reference stack trace and the electronically received stack trace. Specifically, the fatal hunt portion of the ASEA system determines whether the reference stack trace has sufficient similarities with the electronically received stack trace. In the present embodiment, sufficient similarities exist when the electronically received stack trace and the reference stack trace have eight or more of the same procedure calls present in the same order. The present invention is well suited to varying the number of procedure calls which must match and be in the same order before sufficient similarity is said to exist between the electronically received stack trace and the reference stack trace. Thus, the present invention is well suited to selectively choosing the "nth" degree of similarity which is required for "sufficient similarity."

Next, in step 150, if a match, i.e. sufficient similarity, does not exist, the present ASEA system performs step 100 and either step 110 or step 120 as described above in detail. The present invention is also well suited to ranking the degree of similarity between the electronically received stack trace and the reference stack trace. That is, in an embodiment where the electronically received stack trace is compared with a plurality of reference stack traces, the reference stack traces are ranked according to the degree of similarity with the electronically received stack trace. If sufficient similarities do exist between the electronically received stack trace and the reference stack trace, the present invention proceeds to step 160.

At step 160, the ASEA system searches a documented system error database for information on the known system error associated with the reference stack trace having sufficient similarity to the electronically received stack trace. As mentioned above, each of the reference stack traces has a respective known system error associated therewith. Thus, there is a substantial likelihood that the fatal system error of the electronically received stack trace would be the same as or similar to the known system error associated with a reference stack trace. There exists a likelihood of similar system errors because the electronically received stack trace has sufficient similarity to the reference stack trace. Hence, the unknown system error may be the same as or very similar to the known system error. In the present embodiment, the information is, in fact, information about the known system error associated with reference stack trace matching the electronically received stack trace. The information in the database is, for example, a series of steps or "workarounds" that the user can use to avoid or correct the fatal system error. For example, the information may inform the user that the known fatal system error results from an improper data field entry. The information would then describe the proper method to enter data into the field in the future. Thus, the user would no longer encounter such a fatal system error. It will be understood that the present ASEA system is well suited to providing various types of information or workarounds related to the fatal system error encountered by the user. In an embodiment in which the electronically received stack trace has sufficient similarity to more than one reference stack trace, the ASEA system searches the documented system error database for information on the each of the respective known system errors.

In step 170, if information related to the known system error associated with reference stack trace matching the electronically received stack trace does not exist, the present ASEA system performs step 100 and either step 110 or step 120 as described above in detail. If information regarding the known system error does exist, the present invention proceeds to perform step 180.

In step 180, the information related to the known system error associated with reference stack trace matching the electronically received stack trace is automatically forwarded to the user. That is, the ASEA system e-mails the information to the user. The ASEA system obtains the user's e-mail address from the return address attached to the stack trace information sent from the user. In so doing, the present invention automatically electronically forwards information regarding a fatal system error to the user. Although the information is forwarded in such a manner in the present embodiment, the ASEA system is also well suited to forwarding the information using various other methods. Once the information is forwarded to the user, the present invention proceeds to step 120 and the ASEA system directs a support center engineer to follow up with the user.

A routine used in one embodiment of the fatal hunt portion of the ASEA system is given below:

1. Parse electronically received stack trace to remove interrupt handler
2. List all reference stack traces
3. Loop for each reference stack trace do:
   a. parse reference stack trace to remove interrupt handler calls & receive order
   b. compare procedure calls in electronically received stack trace to reference stack trace
   c. if number of matched procedure calls is at least 8 then:
      i. record fatal system error number of reference stack trace and number of matched procedure calls end 4. Loop for all recorded known system error/reference stack trace pairs in descending order of number of matched procedure calls
   a. print fatal system error number
   b. print list of common interrupt handler routines
   c. print list of matching procedure calls in stack trace end 5. If no fatal system error number/reference stack trace pairs recorded, suggest that engineer add this fatal system error to the documented system error database Although such an approach is used in the present embodiment, the present invention is also well suited to using various other routines to accomplish the fatal hunt portion of the ASEA system.

The present invention is also well suited to ranking the information forwarded to the user. That is, the greater the degree of similarity between the reference stack trace and the electronically received stack trace, the greater the likelihood that the system error information of the known system error will pertain to the user's system error. Thus, the user is informed as to which of the forwarded information is ranked the highest. Furthermore, the fatal hunt portion of the ASEA system may also categorize the possible stack trace matches into categories for the user. The categories such as, for example, most likely, less likely, and possible, indicate the degree of similarity between the electronically received stack trace and the reference stack trace.

Thus, the present ASEA system automatically determines the nature of a program system error. The ASEA system also quickly reports the potential source of the system error to the user of the program which has suffered the system error. Finally, the ASEA system provides the above benefits without requiring extensive customer support intervention.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

We claim:

1. In a computer system including a processor coupled to a bus, and a memory unit coupled to said bus for storing information, a computer-implemented method for evaluating a program system error comprising the computer-implemented steps of:

a) electronically receiving, via e-mail, a stack trace of a program which has suffered an unknown system error;

b) automatically determining whether a correlation exists between said electronically received stack trace and a reference stack trace having a known system error associated therewith such that said unknown system error is analyzed, said step of automatically determining whether a correlation exists further comprising the steps of:

b1) comparing said electronically received stack trace with a plurality of reference stack traces to determine whether similarities exist between said electronically received stack trace and each of said plurality of reference stack traces, each of said reference stack traces having a respective known error associated therewith;

b2) determining the degree of similarity between said electronically received stack trace and each of said plurality of reference stack traces; and b3) ranking said plurality of reference stack traces from greatest degree of similarity with said electronically received stack trace to least degree of similarity with said electronically received stack trace; and c) automatically reporting information related to said unknown system error to the address from which said electronically received stack trace originated.

2. The computer-implemented method as recited in claim 1 further comprising the step of:

determining whether said electronically received stack trace of said program which has suffered said unknown system error was sent by a valid user of said program.

3. The computer-implemented method as recited in claim 1 further comprising the steps of:

electronically receiving a stack trace of encoded procedural call names; and decoding said electronically received stack trace of encoded procedural call names such that a corresponding stack trace of decoded procedural call names is generated.

4. The computer-implemented method as recited in claim 1 wherein step b) further comprises the step of:

comparing said electronically received stack trace of said program which has suffered said unknown system error with said reference stack trace to determine whether similarities exist therebetween.

5. The computer-implemented method as recited in claim 4 wherein step c) further comprises the step of:

automatically electronically forwarding information regarding said known system error to a user of said program which has suffered said unknown system error if sufficient similarities exist between said electronically received stack trace and said reference stack trace.

6. The computer-implemented method as recited in claim 4 wherein step c) further comprises the step of:

automatically directing a customer support person to contact a user of said program which has suffered said unknown system error if sufficient similarities do not exist between said electronically received stack trace and said reference stack trace.

7. The computer-implemented method as recited in claim 1 wherein step c) further comprises the steps of:

automatically electronically forwarding information regarding said known system errors associated with said reference stack traces having at least an nth degree of similarity with said electronically received stack trace; said information forwarded to a user of said program which has suffered said unknown system error;

ranking said electronically forwarded information according to the degree of similarity between said respective plurality of reference stack traces associated with said known system errors and said electronically received stack trace.

8. In a computer system a method for automatically analyzing a program system error comprising the steps of:

a) electronically receiving, via e-mail, a stack trace of a program which has suffered an unknown system error;

b) comparing said electronically received stack trace to a reference stack trace having a known system error associated therewith to determine the similarity between said reference stack trace and said electronically received stack trace, said step of comparing said electronically received stack trace to a reference stack trace further comprising the steps of:

b1) comparing said electronically received stack trace with a plurality of reference stack traces to determine whether similarities exist between said electronically received stack trace and each of said plurality of reference stack traces, each of said reference stack traces having a respective known error associated therewith;

b2) determining the degree of similarity between said electronically received stack trace and each of said plurality of reference stack traces; and b3) ranking said plurality of reference stack traces from greatest degree of similarity with said electronically received stack trace to least degree of similarity with said electronically received stack trace; and c) automatically reporting information about said unknown system error to the address from which said electronically received stack trace was sent.

9. The method as recited in claim 8 further comprising the step of:

determining whether said electronically received stack trace of said program which has suffered said unknown system error was sent by a valid user of said program.

10. The method as recited in claim 8 further comprising the steps of:

electronically receiving a stack trace of encoded procedural call names; and decoding said electronically received stack trace of encoded procedural call names such that a corresponding stack trace of decoded procedural call names is generated.

11. The method as recited in claim 8 wherein step c) further comprises the step of:

automatically electronically forwarding information regarding said known system error to a user of said program which has suffered said unknown system error if sufficient similarities exist between said electronically received stack trace and said reference stack trace.

12. The method as recited in claim 8 wherein step c) further comprises the step of:

automatically directing customer support personal to contact a user of said program which has suffered said unknown system error if sufficient similarities do not exist between said electronically received stack trace and said reference stack trace.

13. The method as recited in claim 8 wherein step c) further comprises the steps of:

automatically electronically forwarding information regarding said known system errors associated with said reference stack traces having at least an nth degree of similarity with said electronically received stack trace; said information forwarded to a user of said program which has suffered said unknown system error;

ranking said electronically forwarded information according to the degree of similarity between said respective plurality of reference stack traces associated with said known system errors and said electronically received stack trace.

14. A computer-usable medium having computer-readable program code embodied therein for causing a computer to perform the steps of:

a) electronically receiving, via e-mail, a stack trace of a program which has suffered an unknown system error;

b) automatically determining whether a correlation exists between said electronically received stack trace and a reference stack trace which has a known system error associated therewith such that said unknown system error is analyzed, said step of automatically determining whether a correlation exists between said electronically received stack trace and said reference stack trace further comprising the steps of:

b1) comparing said electronically received stack trace with a plurality of reference stack traces to determine whether similarities exist between said electronically received stack trace and each of said plurality of reference stack traces, each of said reference stack traces having a respective known error associated therewith;

b2) determining the degree of similarity between said electronically received stack trace and each of said plurality of reference stack traces; and b3) ranking said plurality of reference stack traces from greatest degree of similarity with said electronically received stack trace to least degree of similarity with said electronically received stack trace; and c) automatically reporting information about said unknown system error to the address from which said electronically received stack trace originated.

15. The computer-usable medium of claim 14 wherein said computer-readable program code embodied therein causes a computer performing step a) to further perform the step of:

electronically receiving a stack trace of encoded procedural call names; and decoding said electronically received stack trace of encoded procedural call names such that a corresponding stack trace of decoded procedural call names is generated.

16. The computer-usable medium of claim 14 wherein said computer-readable program code embodied therein causes a computer to further perform the step of:

determining whether said electronically received stack trace of said program which has suffered said unknown system error was sent by a valid user of said program.

17. The computer-usable medium of claim 14 wherein said computer-readable program code embodied therein causes a computer performing step c) to further perform the step of:

automatically electronically forwarding information regarding said known system error to a user of said program which has suffered said unknown system error if sufficient similarities exist between said electronically received stack trace and said reference stack trace.

18. The computer-usable medium of claim 14 wherein said computer-readable program code embodied therein causes a computer performing step c) to further perform the step of:

automatically directing customer support personal to contact a user of said program which has suffered said unknown system error if sufficient similarities do not exist between said electronically received stack trace and said reference stack trace.

19. The computer-usable medium of claim 14 wherein said computer-readable program code embodied therein causes a computer performing step c) to further perform the steps of:

automatically electronically forwarding information regarding said known system errors associated with said reference stack traces having at least an nth degree of similarity with said electronically received stack trace; said information forwarded to a user of said program which has suffered said unknown system error;

ranking said electronically forwarded information according to the degree of similarity between said respective plurality of reference stack traces associated with said known system errors and said electronically received stack trace.

* * * * *